UNITED STATES PATENT OFFICE.

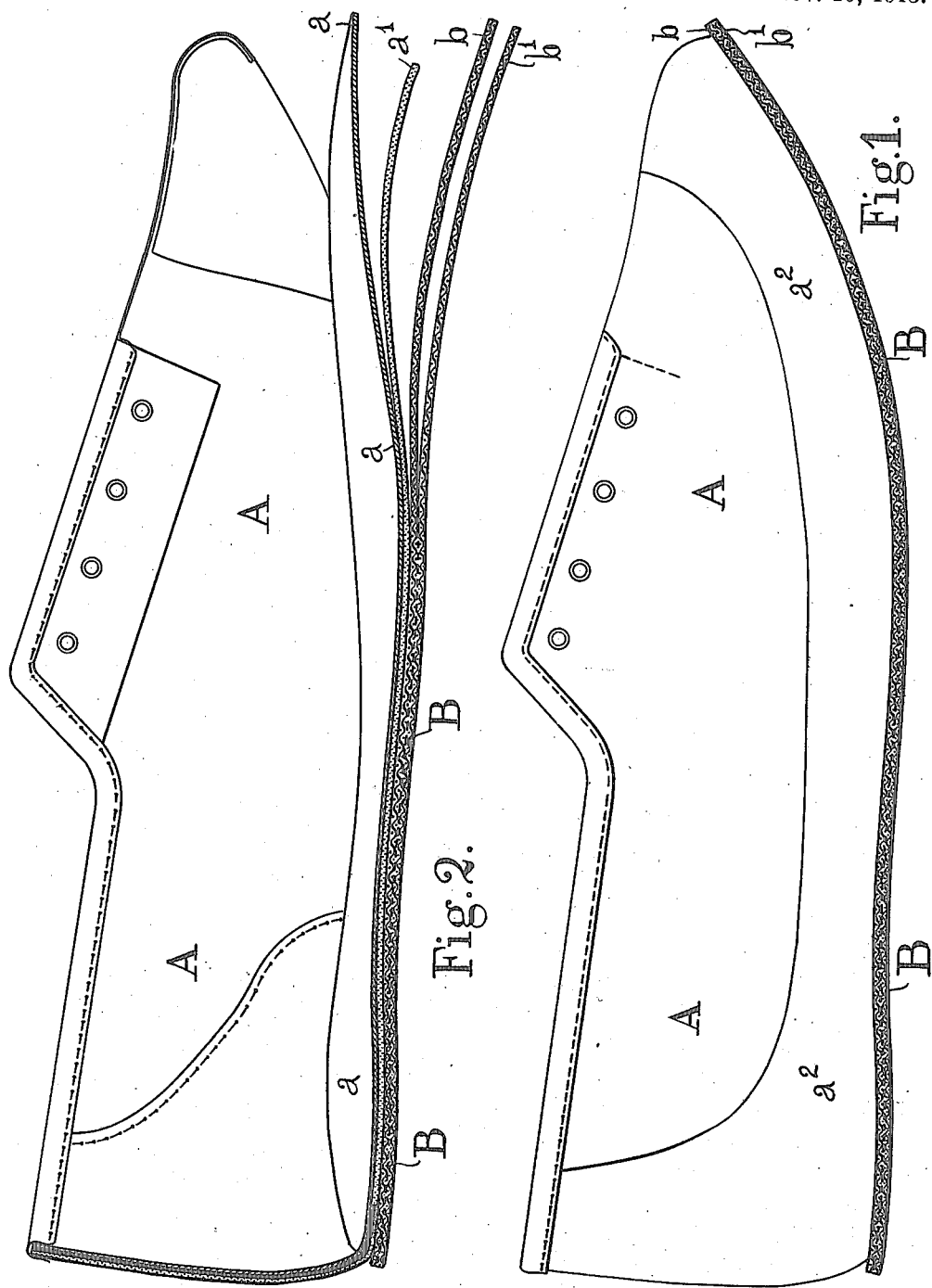

SYDNEY FRANKENBURG AND FREDERICK HENRY BETTERIDGE, OF SALFORD, ENGLAND.

CANVAS SHOE.

1,160,873.　　　　Specification of Letters Patent.　　Patented Nov. 16, 1915.

Application filed April 4, 1914. Serial No. 829,656.

*To all whom it may concern:*

Be it known that we, SYDNEY FRANKENBURG and FREDERICK HENRY BETTERIDGE, British subjects, both residing at Salford, county of Lancaster, England, have invented certain new and useful Improvements in Canvas Shoes, of which the following is a specification.

This invention relates to canvas and rubber shoes for gymnastic and athletic purposes such as are now made with canvas uppers and rubber soles and either with or without a golosh of rubber along the sides.

The object of the invention is to manufacture throughout, at one process, a canvas shoe with impregnated canvas sole.

It consists, essentially, in forming the shoe, the upper of canvas and rubber, applying thereto while still unvulcanized an insole of woven fabric, a thin layer of rubber composition, or other vulcanizable material, and one or more plies of woven fabric impregnated with balata, gutta percha, rubber or caoutchouc with a vulcanizable rubber coating between each ply, rolling or pressing the parts together as they are placed in position, and finally subjecting the shoe thus made to a heat sufficient to vulcanize the rubber of the shoe and the rubber coating between the plies.

It will be fully described with reference to the accompanying drawings, in which:

Figure 1 is a side elevation of the shoe, and Fig. 2 is a longitudinal section of same showing the component parts separated.

The body of the shoe is built up in the ordinary way of an upper A of canvas, an insole $a$ of canvas, and a layer of rubber composition or other vulcanizable material $a'$, applied to the lower surface of the insole, and either with or without a golosh $a^2$, but with the ordinary thick sole of sheet rubber or caoutchouc omitted.

Instead of the ordinary detached sole of sheet rubber or caoutchouc, separately prepared, we apply a sole B of woven fabric treated or impregnated with balata or gutta percha, or, instead, the sole B may be treated or impregnated with rubber or caoutchouc.

The sole B may be of canvas or other suitable woven fabric, and is preferably in two layers $b\ b'$, the layer $b$ impregnated with rubber and capable of being vulcanized, and the layer $b'$ impregnated with balata and caused to adhere to the other layer by a layer of rubber. The sole B may, if desired, be molded under pressure, or pressure and heat, before being applied to the shoe to consolidate it.

When the upper A is complete with the insole $a$ and the layer of rubber composition $a'$, to the under side of the said layer $a'$, but before the rubber of the shoe is vulcanized, we apply a layer or coating of rubber of a highly sticky nature and capable of being vulcanized, and upon this we lay the layer or ply $b$ of the sole B, of impregnated woven material, which is rolled or pressed thereto and caused to adhere, and subsequently the ply $b'$, also with a coating of rubber capable of being vulcanized, is similarly applied. The edges of the sole B may be finished off by a covering of rubber.

The shoe may be placed in a suitable mold or machine to press the sole B to the shoe.

The shoe is cured and finished in the ordinary way. For example, after the plies $b$ and $b'$ of impregnated fabric have been applied to the shoe, the latter is placed in an oven and subjected to heat sufficient to vulcanize the rubber compounds therein.

We claim:—

A composite gymnastic or athletic shoe comprising an upper of canvas, an insole of woven fabric, a layer of vulcanized rubber composition integrally united to the lower surface of the insole, and an outer sole integrally united to the layer of rubber composition by a vulcanized interposed layer, said outer sole consisting of upper and lower layers of woven fabric impregnated with vulcanized gum and integrally united by an interposed layer of vulcanized gum.

In testimony whereof we have hereunto set our hands in presence of two subscribing witnesses.

SYDNEY FRANKENBURG.
　　　　FREDERICK HENRY BETTERIDGE.

Witnesses:
　GEO. H. O'BRIEN,
　HARRY BARNFATHER.